April 14, 1953     O. E. NELSON     2,635,008
HOSE REEL
Filed Dec. 30, 1949
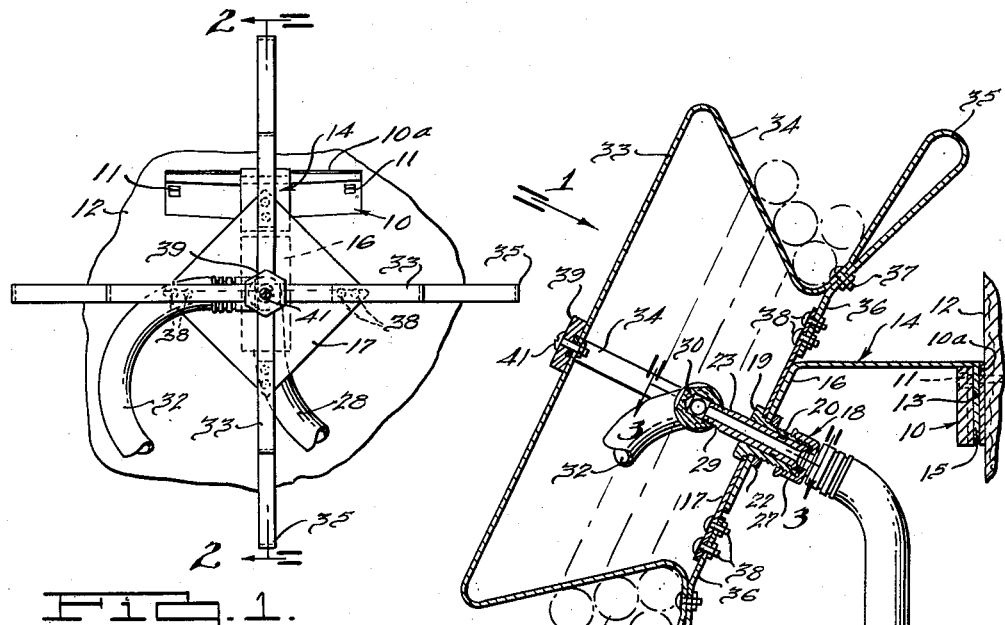
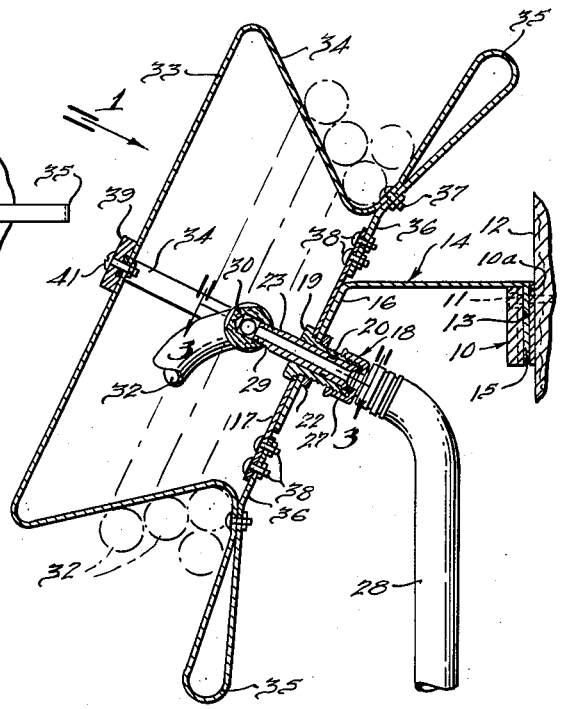
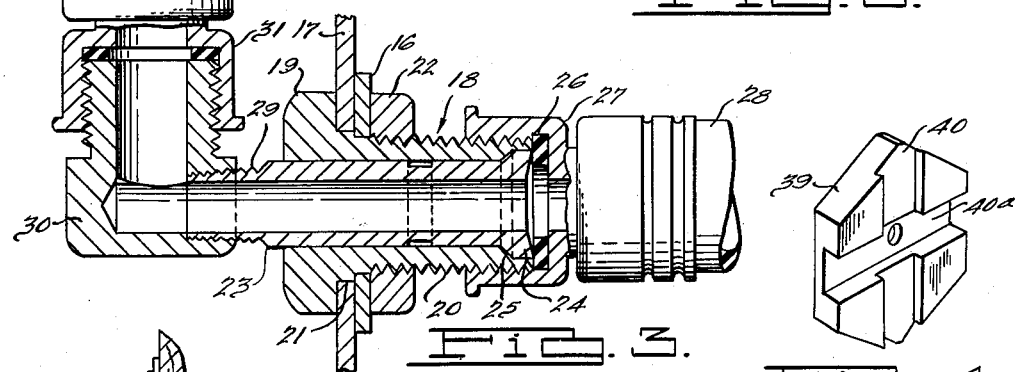
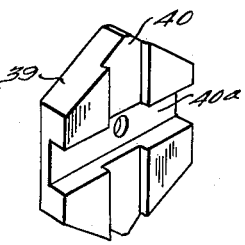
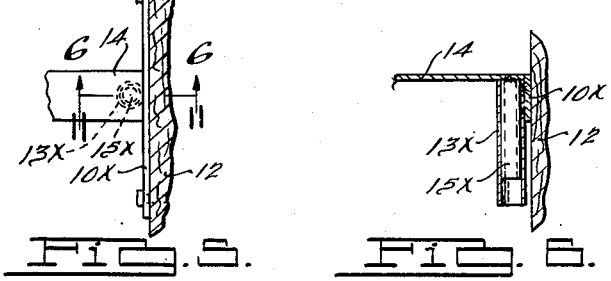
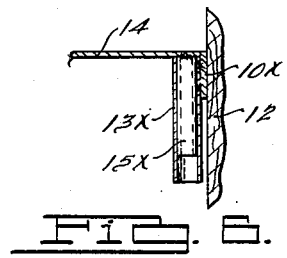
INVENTOR.
Oscar E. Nelson,
BY Jay C Taylor
ATTORNEY.

Patented Apr. 14, 1953

2,635,008

UNITED STATES PATENT OFFICE 2,635,008

HOSE REEL

Oscar E. Nelson, Dearborn, Mich.

Application December 30, 1949, Serial No. 135,874

11 Claims. (Cl. 299—78)

The present invention relates to a new and improved hose reel which may be detachably affixed to a rigid structure such as the side of a building, whereby a hose may be reeled on or off the reel frame without being disconnected from the fluid supply line.

Prior to the present invention, hose reel constructions of the foregoing nature have been objectionable mainly because of their tendency to leak at connections between rotatable and non-rotatable members in spite of packing glands and the like. Unless such hose reels were of expensive precision construction, leakage at the rotatable connections, which usually employed a screw action, could only be stopped by tightening the connection to the extent that rotation was hampered. The resulting frictional contact between relatively rotatable parts at the connection would thus tend to loosen and unscrew the same during reeling operations, causing the aforesaid leakage. In addition, many such constructions have been complicated, heavy and unwieldy, rendering them expensive and difficult to handle.

Accordingly it is an object of the present invention to provide a lightweight hose reel which may be detachably connected quickly and easily to a simple wall fixture or the like, and which will permit rotation of the reel frame while maintaining a fluid tight connection between the hose and the source of fluid supply.

In a preferred construction, the rotatable connection between the hose and source of fluid supply comprises an outer coupling member having a bore therethrough and an inner coupling member having a tubular portion within the bore, one member comprising a rotatable member and being rotatably supported by the other, one member also having the reel mounted thereon for rotation with the rotatable member. The inner member is provided with coupling means at one end and is suitably retained within said bore against axial movement relative to the outer member in a direction toward said coupling means. The outer member is also provided with means for holding a second coupling means snugly against the other end of the inner member in fluid communication therewith. Preferably the latter end of the inner member terminates flush with the end of the bore of the outer member, so that a gasket element of the second coupling is held snugly against said flush ends to complete a fluid tight seal.

Another object is to provide a simple and sturdy hose reel structure which is easily assembled and which may be packed unassembled as a compact flat item, the hose reel including a bracket, adapted for attachment to a wall or the like, and a rigid reel support for a rotatable reel frame, the reel support being adapted to seat removably in the bracket without moving when the reel frame is rotated. By virtue of the latter construction, a number of brackets may be employed, one located permanently at each place where mounting of the reel is desired, as for example in a basement for winter storage or in a yard or garden. The reel may then be readily moved from one location to another as desired, materially increasing its serviceability.

Another object is to provide a hose reel embodying an improved lightweight sturdy skeletal reel frame comprising a plurality of strip metal arms effectively held in spaced relation by improved means. In a preferred construction, the reel comprises a rotatable hub plate having a bearing surface mounted flush against a mating bearing on the reel support. Preferably these mating bearing surfaces are inclined to the vertical so as to tilt the reel and axis of rotation upward toward the operator to facilitate operation of the reel.

The reel frame comprises a plurality of strip members crossing radially in lapping relation forward of the hub plate along the reel axis and maintained in fixed relation with respect to each other by clamping means including a retaining cap having grooves within which the lapping strip members are positively clamped. The strip members are formed radially of the clamping means to provide generally V-shaped hose receiving portions reinforced by attachment of the members to the hub plate.

The aforementioned coupling members preferably pierce the hub plate and reel support coaxially with the reel and are employed to assist in retaining the bearing surfaces in mating relation. The rotatable coupling member is adapted for connection with the hose to be reeled and this connection is preferably at right angles to the reel axis so as to minimize the tendency to unscrew and loosen as the hose is reeled.

Other objects of this invention will appear in the following description and appended claims, reference being had to the accompanying drawings forming a part of this specification wherein like reference characters designate corresponding parts in the several views.

In one embodiment of the present invention, a bracket means adapted for attachment to a wall or the like provides a vertical upward opening receptacle. A rigid reel support is provided having a downwardly extending arm detachably disposed within the receptacle in a position which permits movement of the rigid reel support in a substantially vertically upward direction only.

The body of the reel support extends generally horizontally outward from the depending arm and terminates in an outwardly declined plane bearing surface. A rotatable reel having a hub plate is mounted with the hub plate confronting the bearing surface to rotate thereon, the bearing surface and hub plate being pierced by a connecting sleeve coaxial with the axis of rotation of the reel. The connecting sleeve has an external threaded portion on one end for coupling with a lead-in hose, which communicates with a water source, and an internal annular seat at the same end. Disposed within the connecting sleeve is a rotatable spindle having a collar at one end adapted to locate in the aforesaid annular seat and to be retained therein by the coupling on the lead-in hose when the latter is connected to the adjacent end of the connecting member. The other end of the spindle is provided with a joint adapted for connection to a garden hose. Reel arms are provided which fit with the reel plate to form a reel frame adapted to accommodate convolutions of the garden hose and are rigidly joined along the axis of rotation at a point spaced from the hub plate.

In the drawings:

Fig. 1 is a face view of a hose reel embodying the present invention, taken perpendicular to the plane of the reel frame in the direction of the arrow 1 of Fig. 2, the inlet conduit, hose, and wall structure being fragmentarily shown.

Fig. 2 is an enlarged vertical mid-section taken along the line 2—2 in the direction of the arrows, Fig. 1.

Fig. 3 is an enlarged mid-section through the rotatable coupling, taken along the line 3—3 in the direction of the arrows, Fig. 2.

Fig. 4 is a perspective view of the retainer for the reel arms which comprise the reel frame.

Fig. 5 is a fragmentary top view of a modification of the fastening member and reel support arm, a fragmentary portion of a wall being shown in section.

Fig. 6 is a side elevational mid-section taken along the line 6—6 of Fig. 5 in the direction of the arrows.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A preferred embodiment of the present invention is shown in Figs. 1-4 of the drawings and includes a bracket 10 having a vertical slot in the back thereof. The bracket 10 is secured to a rigid protector plate 10a, as for example by a plurality of screws 11 which also secure the bracket 10 and plate 10a to any suitable support, such as the side of a building 12. The slot in the bracket 10 and the adjacent portion of the plate 10a form a slot or receptacle 13 which is open at the top.

A rigid reel support 14 is provided at one end with a downwardly extending arm 15 which is detachably inserted into the receptacle 13. By virtue of the plate 10a, scoring or marking the adjacent sidewall of the building 12 is avoided upon repeated insertion of the arm 15 into the receptacle. The longitudinal axis of the reel support 14 is disposed at substantially right angles to the arm 15 as shown in Fig. 2. The other end of the support 14 is bent downwardly less than ninety degrees from the longitudinal axis of the reel supporting member to provide a bearing member 16.

A reel hub plate 17 confronts the bearing face 16 of the reel supporting member 14, and both the bearing face 16 and hub plate 17 have centrally located holes extending therethrough, the hole in the hub plate 17 being of larger diameter than the hole in the bearing member 16. A hollow sleeve 18 having a flange 19 at one end and a threaded portion 20 at the other end is inserted first through the hub plate 17 and then through the bearing face 16, the flange 19 lying flush against the hub plate 17. A shoulder 21 is formed adjacent the flange 19 and seats the sleeve 18 in the hub plate 17. The axial dimension of the shoulder 21 is slightly greater than the thickness of the plate 17 so as to afford a slight clearance between each side of the plate 17 and the adjacent flange 19 and plate 16, allowing rotation of the hub plate 17 freely with respect to the bearing face 16. A nut 22 on the screw-threaded portion 20 of the sleeve 18 is drawn tightly against the bearing member 16.

A tubular spindle 23 is rotatable coaxially within the sleeve 18 and has an annular collar or bearing 24 at one end adapted to locate in an interior annular bearing or seat 25 within the threaded end of the sleeve 18. The bore of the sleeve 18 and outer diameter of the spindle 23 are dimensioned to permit the latter to rotate freely, but with a minimum of play or lost motion. Likewise, the mating bearing surfaces of the collar 24 and seat 25 are dimensioned so that the outer extremity of the collar 24 is flush with the outer extremity of the threaded end of the sleeve 18 when these members are in seated relation, Fig. 3. The juxtaposed surfaces of these members need not be ground or polished, since they are not subject to hard usage and the relative rotation therebetween is both infrequent and at slow speeds. Accordingly, the members 18 and 23 may be economically formed within screw machine tolerances.

These members are maintained in seated relation by the customary rubber washer 26 ordinarily employed within the usual hose coupling 27 which is screwed snugly on the threaded portion 20. The coupling 27 is secured to one end of an inlet conduit 28, which is attached at its other end to a water source (not shown).

It is to be observed in Fig. 3 that the outer end of the collar 24 is slightly concave so that only the outer circumference of the latter engages the washer 26. Frictional engagement between the collar 24 and washer 26 is thus minimized and is appreciably less than the frictional engagement between the washer 26 and the adjacent non-rotatable portions of sleeve 18 and base of the coupling 27 in contact with the washer 26. As a result, rotation of the spindle 23 is not appreciably hindered by the washer 26, nor is the latter caused to rotate by reason of its frictional contact with the spindle 23, so that inadvertent unscrewing of the extension 20 from the coupling 27 upon rotation of the spindle 23 is avoided.

The other end of the spindle 23 extends beyond the flange 19 of the sleeve 18 and terminates in a tapered screw-threaded portion 29.

An L-coupling 30 is screwed on the portion 29 and is provided at its free end with an externally threaded portion adapted to be detachably connected with the usual threaded coupling 31 of a garden hose 32.

By virtue of this construction, the tapered screw-threaded connection between the coupling 30 and portion 29 may be drawn tightly by suitable hand tools to prevent accidental loosening of the connection. The threaded connection between the hose coupling 31 and L-coupling 30 may be conveniently tightened or loosened by hand. Inasmuch as the latter connection is at right angles to the axis of rotation of the spindle 23, any tendency of the coupling 31 to unscrew during a reeling operation is avoided. Thus the latter coupling need not be tightened to the extent that manual loosening thereof is difficult.

The frame of the reel comprises a plurality of metal cross strips 33 (Figs. 1 and 2). Two of such strips 33 crossing each other perpendicularly at a location spaced forward of the plate 16 on the axis of rotation of the spindle 23 have been found satisfactory, although the invention is not limited to any particular number. Each cross strip 33 is bent radially inward at opposite ends toward diagonally opposed corners of the plate 17, then outward to form a pair of diametrically opposed outward opening V-shaped hose receiving portions 34, Fig. 2. The ends of the strips 33 are then looped outward and back on themselves at 35 toward the vertices of the V-portions 34 and terminate in radially inward extensions 36 suitably secured to the aforesaid diagonally opposed corners of the plate 17, as for example by bolts 38. The sides of each loop 35 are joined near the vertex of the corresponding V-portion 34 by suitable means such as the nut and bolt assembly 37.

The strips 33 are maintained in fixed relation with respect to each other at their point of crossing by means of a retainer 39, Fig. 4, having perpendicularly crossing grooves 40 and 40a adapted to receive the crossing strips 33 snugly therein. The depth of the groove 40a is greater than the depth of the groove 40 by the thickness of the outer strip 33. The latter is thus received by the groove 40a and rests solidly against the base thereof. Similarly the inner strip 33 fits into the groove 40 solidly against the base thereof. Aligned axially extending bolt holes are provided in the center of the retainer 39 and crossing strips 33, whereby the assembly is rigidly secured together by a nut and bolt assembly 41. It is apparent from the structure described thus far, including the various screw threaded connections, that the hose reel may be readily assembled by a home owner and may also be packed in a small flat package prior to assembly to facilitate handling at the factory and shipment.

In operation, the assembled reel structure is supported by the arm 14 resting solidly within the socket or receptacle 13. A short length of lead-in hose 28 is coupled between the threaded portion 20 and a source of water supply and the hose 32 is also connected with the coupling 30 as illustrated and described above. Thereafter the hose is reeled on or off the reel frame about the axis thereof, being confined within the V-shaped hose receiving portions 34 as indicated in phantom, Fig. 2. During reeling operations, the sleeve 18 and support 16 remain fixed and the reel hub 17 and spindle 23 rotate in unison, permitting the end portion of the hose 32 connected with the L-coupling 30 to rotate with the reel in fixed relation therewith. Accordingly a continuous water tight communication between the inlet hose 28 and garden hose 32 is maintained at all times through the tubular spindle 23.

A modification of the bracket and reel support is shown in Figs. 5 and 6, comprising a bracket 10x provided with a vertical tubular receptacle 13x. Instead of the depending arm portion 15, the reel support 14 is provided with a downward extending pintle 15x adapted to fit snugly into the receptacle 13x. In other respects, the reel structure is substantially the same as described above. The portion of the reel support above the pintle 15x is adapted to abut the outer surface of the bracket 10x solidly to prevent rotation of the pintle 15x within the receptacle 13x. By this structure, the protector plate 10a, Fig. 2, is rendered unnecessary, since contact between the reel support and supporting wall 12 or like structure is avoided.

In either embodiment shown, the only path of possible movement of the reel support 14 is vertically upward out of its receptacle. By virtue of the inclination of the axis of the reel frame, the latter is both made more accessible for operation and any tendency to pull the arm or pintle from its bracket receptacle during operation is minimized.

Having thus described by invention, I claim:

1. In a hose reel structure adapted to have a hose reeled thereon while the latter is connected to a source of fluid supply, a bracket having an apertured reel supporting plate, a rotatable reel having an apertured hub plate disposed with one face of the hub plate confronting said supporting plate with the apertures aligned, a sleeve member having a flange engaging the other face of the hub plate and having an externally threaded extension projecting from said flange through said apertures, a retaining nut screwed on said extension snugly against said supporting plate to confine the latter and hub plate between the retaining nut and flange, an inner tubular member journaled within the sleeve member, one of said members being rotatable coaxially with the reel, means at one end of the inner tubular member attachable with a fluid conduit, and means on the sleeve member attachable with a fluid conduit in communication with the other end of the inner tubular member.

2. In a hose reel structure adapted to have a hose reeled thereon while the latter is connected to a source of fluid supply, a tubular inner member coaxial with said reel, a tubular outer member sleeved coaxially over the inner member, said members being relatively rotatable with respect to each other, coupling means at one end of the inner member attachable with a fluid conduit, the other end of the inner member having an integral annular bearing flange seating within a mating annular bearing recess in the outer member, the bearing flange having an axial end portion terminating axially flush with an axial end portion of the outer member, and coupling means seated against said flush end portions in fluid communication with the inner member and detachably connected to the outer member.

3. In a hose reel structure adapted to have a hose reeled thereon while the latter is connected to a source of fluid supply, a rotatable reel having an apertured hub, a bracket attachable to a fixed structure and having an apertured reel support adjacent one face of the hub with the apertures aligned, a flanged sleeve extending through said apertures with the flange engaging the other face of the hub, the sleeve having an annular bearing surface spacing the flange and support and the hub being journaled on said bearing surface, said bearing surface terminating at an annular shoulder abutting said support and spacing said bearing surface and a sleeve portion of reduced diameter, retaining means holding said shoulder tightly against the support, an inner tubular member journaled within the sleeve member and having one end attachable with a fluid conduit, and means on the sleeve member engageable with a second fluid conduit in communication with the other end of the inner member.

4. In a hose reel structure adapted to have a hose reeled thereon while the latter is connected to a source of fluid supply, a bracket having an apertured reel supporting arm, a rotatable reel having an apertured hub, the arm and hub being arranged side by side with their apertures aligned, a sleeve member having a flange engaging the axial side of the hub remote from the arm, said sleeve member extending axially from said flange through the aligned apertures and having a portion projecting beyond the axial side of the arm remote from the hub, screw threaded means cooperating with said arm and sleeve to hold the sleeve flange adjacent said hub, an inner tubular member journaled within the sleeve member, one of said members being rotatable coaxially with the reel, means at one end of the inner tubular member attachable with a fluid conduit, and screw threaded means on the aforesaid projecting portion of the sleeve member attachable with a fluid conduit in communication with the other end of the inner tubular member.

5. In a hose reel structure adapted to have a hose reeled thereon while the latter is connected to a source of fluid supply, a bracket having an apertured reel supporting arm, a rotatable reel having an apertured hub, the arm and hub being arranged side by side with their apertures aligned, a sleeve member having a flange engaging the axial side of the hub remote from the arm, said sleeve member extending axially from said flange through the aligned apertures and having a portion projecting beyond the axial side of the arm remote from the hub, retaining means holding said flange adjacent the hub to retain the latter adjacent the arm, an inner tubular member journaled within the sleeve member, one of said members being rotatable coaxially with the reel, means at one end of the inner tubular member attachable with a fluid conduit, and means on the projecting portion of the sleeve member attachable with a fluid conduit in communication with the other end of the inner tubular member.

6. In a hose reel structure adapted to have a hose reeled thereon while the latter is connected to a source of fluid supply, a bracket having an apertured reel supporting arm, a rotatable reel having an apertured hub, the arm and hub being juxtaposed with their apertures aligned axially, a sleeve member having a flange engaging an axial side of the hub remote from the arm, said sleeve member extending axially from said flange through the aligned apertures and having a coupling portion spaced from the arm, retaining means holding said sleeve flange against axial displacement from the hub, an inner tubular member journaled within the sleeve member, one of said members being rotatable coaxially with the reel, means at one end of the inner tubular member attachable with a fluid conduit, and means separate from said arm comprising a fluid conduit in communication with the other end of the inner tubular member and detachably connected with said coupling portion of the sleeve.

7. In a hose reel structure adapted to have a hose reeled thereon while the hose is connected with a source of fluid, a bracket attachable to a fixed support and having a rigid bearing plate extending in an inclined plane, a rotatable reel having a bottom hub plate arranged face to face on the bearing plate in bearing relation therewith and with the axis of the reel tilted upward, tubular journal means extending through aligned apertures in said two plates and rotatably supporting the hub plate on the bearing plate, said tubular journal means being attachable at its upper and lower ends respectively to fluid conduits adjacent the upper surface of the hub plate and under surface of the bearing plate.

8. In a hose reel structure adapted to have a hose reeled thereon while the hose is connected with a source of fluid, a bracket attachable to a fixed support and having a rigid bearing plate extending in an inclined plane, a rotatable reel having a hub plate arranged face to face on the reel supporting plate in bearing relation and with the axis of the reel tilted upward, a sleeve member extending axially of the reel and having a flange engaging the upper side of the hub plate, the sleeve member extending downward from the flange through aligned apertures in the two plates, retaining means engaging said sleeve member to hold the sleeve flange against axial displacement from said hub plate, an inner tubular member rotatably seated within the sleeve member, the upper end of the inner tubular member being attachable with a fluid conduit in communication therewith, and the lower end of the sleeve member being attachable with a fluid conduit in communication with the lower end of the inner tubular member.

9. In a hose reel structure adapted to have a hose reeled thereon while the latter is connected to a source of fluid supply, a tubular inner member coaxial with said reel, a tubular outer member sleeved coaxially over the inner member, said members being relatively rotatable with respect to each other, means at one end of the inner member attachable with a fluid conduit, the other end of the inner member having an integral annular bearing flange seating within a mating annular bearing recess in the outer member, the bearing flange terminating axially in an end portion cooperating with an axial end portion of the outer member to comprise a seat for a coupling means, and coupling means seated against said cooperating end portions in fluid communication with the inner member and detachably connected to the outer member.

10. In a hose reel structure adapted to have a hose reeled thereon while the latter is connected to a source of fluid supply, a tubular inner member coaxial with said reel, a tubular outer member sleeved coaxially over the inner member, said members being relatively rotatable with respect to each other, means at one end of the inner member attachable with a fluid conduit, the other end of the inner member having an integral annular bearing flange seating within a mating annular bearing recess in the outer member, the bearing flange terminating axially in an end portion cooperating with an axial end portion of the outer member to comprise a seat for a coupling means.

11. In a hose reel structure adapted to have a hose reeled thereon while the latter is connected to a source of fluid supply, a tubular inner member coaxial with said reel, a tubular outer member sleeved coaxially over the inner member, said members being relatively rotatable with respect to each other, an annular bearing flange at one end of the inner member, said flange seating within a mating annular bearing recess in the outer member and terminating axially in an end portion cooperating with an axial end portion of the outer member to comprise a seat for a coupling means, one of said members having a portion attachable with said coupling means seated against said seat, and the other of said members having a portion attachable with a second coupling means.

OSCAR E. NELSON.

References Cited in the file of this patent

UNITED STATES PATENTS

| Number | Name | Date |
|---|---|---|
| 412,499 | Hamilton | Oct. 8, 1889 |
| 476,536 | Hendrix | June 7, 1892 |
| 1,449,730 | Casper et al. | Mar. 27, 1923 |
| 1,814,872 | Wagner | July 14, 1931 |
| 1,848,430 | Morris | Mar. 8, 1932 |
| 1,907,715 | Replate | May 9, 1933 |
| 2,334,141 | Zierden | Nov. 9, 1943 |

FOREIGN PATENTS

| Number | Country | Date |
|---|---|---|
| 72,569 | Norway | Sept. 22, 1947 |